United States Patent [19]

Nozawa

[11] Patent Number: 5,720,560
[45] Date of Patent: Feb. 24, 1998

[54] PRINTING APPARATUS

[75] Inventor: Akihiro Nozawa, Shizuoka, Japan

[73] Assignee: Star Micronics Co., Ltd., Shizuoka, Japan

[21] Appl. No.: 607,257

[22] Filed: Feb. 21, 1996

[30] Foreign Application Priority Data

Feb. 22, 1995 [JP] Japan ................................. 7-034106
Feb. 22, 1995 [JP] Japan ................................. 7-034108

[51] Int. Cl.⁶ ..................................... B41J 29/60
[52] U.S. Cl. ........................ 400/54; 400/74; 395/113
[58] Field of Search ................ 400/54, 74; 395/112, 395/113, 114

[56] References Cited

U.S. PATENT DOCUMENTS

| | | | |
|---|---|---|---|
| 4,834,562 | 5/1989 | Shikanai et al. | 400/54 |
| 5,114,252 | 5/1992 | Tanuma et al. | 400/54 |
| 5,449,238 | 9/1995 | Pham et al. | 400/54 |

FOREIGN PATENT DOCUMENTS

| | | | |
|---|---|---|---|
| 57-155633 | 9/1982 | Japan | 400/74 |
| 4-314569 | 11/1992 | Japan | |
| 4-354017 | 12/1992 | Japan | |
| 5-221088 | 8/1993 | Japan | |
| 2 256 510 | 12/1992 | United Kingdom | |
| 94/05976 | 3/1994 | WIPO | |

*Primary Examiner*—Edgar S. Burr
*Assistant Examiner*—Steven S. Kelley
*Attorney, Agent, or Firm*—Wenderoth, Lind & Ponack

[57] ABSTRACT

A printing apparatus comprises a CPU 1, an image formation part 9, an interface 7 for communicating with an external host apparatus 19, an operation panel 8 which includes an operation switch and the like, etc., and a power cutoff circuit 12 which operates in response to an instruction which is expressed by a power save signal 17. The printing apparatus also comprises a voltage monitoring circuit 15 for monitoring a signal level change of a host side signal, such as a strobe signal, which is supplied from the external host apparatus 19. When the voltage level of the host signal is intermediate between a first reference voltage V1 and a second reference voltage V2, the voltage monitoring circuit 18 judges that power supply to the external host apparatus 19 is cut off.

10 Claims, 15 Drawing Sheets

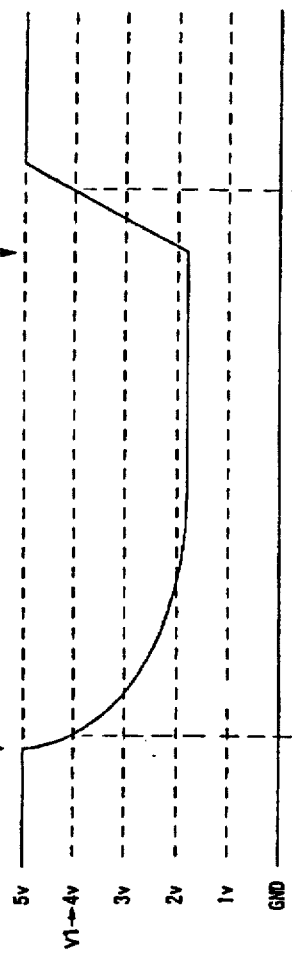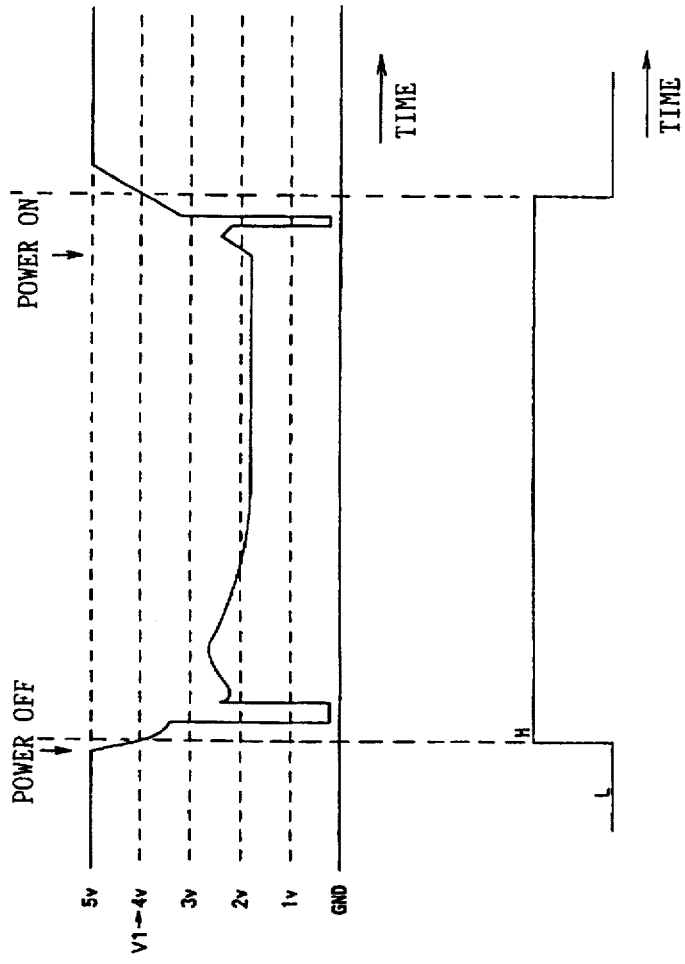

PRINTING APPARATUS

BACKGROUND OF THE INVENTION

1. Technical Field of the Invention

The present invention relates to a printing apparatus for forming an image such as a character and a figure on a recording medium, more particularly, to a printing apparatus capable of monitoring the status of a power supply of an external host apparatus.

2. Description of Related Art

Conventional printers such as serial dot printers are roughly classified into those of an integrated type, which are integrated with a host apparatus such as a word processor, and those of an externally mounted type, which are connected to a separated host apparatus via a signal cable. Typically an integrated type printer shares a power supply circuit with a host apparatus, so that power supply to the printer is automatically cut off when a power supply of the host apparatus is turned off. On the other hand, since the externally mounted type printer incorporates a dedicated power supply circuit, it is necessary to operate the respective power supplies of the host apparatus and the printer separately from each other. Consequently, even when the host apparatus is turned off, the printer is not turned off automatically.

In most cases, a printer is operated in on-line mode in which the printer is activated in response to an instruction given from a host apparatus, and therefore a user does not have many opportunities to directly operate the printer. Consequently, the user very often forgets to turn off the printer when he turns off the host apparatus, this is not desirable from an energy saving viewpoint.

In recent years, in order to reduce the power consumption, there has been proposed a printing apparatus comprising a second power switch for controlling the power supply to specific parts such as a printing mechanism and a display lamp when the apparatus is out of operation. The second power switch, which is composed of a relay and the like, is controlled by a main control circuit.

In such a printing apparatus, when the printing apparatus does not perform printing, for example, where data such as print data or printing control codes are not inputted from an external host system, like a computer, for a predetermined length of time, the main control circuit turns off the second power switch to carry out auto power-off control to suppress the power consumption of the specific parts, and thereafter the apparatus is put into a power saving mode in which electric power is applied only to the main control circuit and the peripheral circuits thereof. In the case where data input is restarted from the external host system in this power saving mode, the second power switch is quickly turned on to activate the printing apparatus, thereby restoring the apparatus to the normal mode where it is capable of printing anytime. The power saving mode also may be released manually by panel switch operation by a user.

In this printing apparatus, the power consumption in the power saving mode is very small, and therefore, the first power switch can be eliminated, whereby a reduction in the number of parts and lowering of costs are realized.

Further, other related arts of a data terminal unit (see Japanese Unexamined Patent Publication JPA 57-155633 (1982)) and a printing apparatus (see Japanese Unexamined Patent Publication JPA 4-354017 (1992)) are directed to reduce power consumption.

FIG. 11 is a block diagram showing an example of an electric structure of a conventional printing apparatus. This printing apparatus comprises a CPU (central processing unit) 51 which manages the operation of the apparatus as a whole, a ROM (read only memory) 52 which serves as a nonvolatile memory, a RAM (random access memory) 53 whose data can be rewritten, an interface (I/F) 57 which connects the printing apparatus to an external host apparatus 50, an operation panel 58 incorporating signal input means such as an operation switch, and signal display means such as an LED (light emitting diode) display and a buzzer, an image formation part 59 for forming an image on a recording medium, and a control circuit 54 for controlling the image formation part 59.

The CPU 51 performs signal processing of data input and output, data transfer, and arithmetic operation, in accordance with a program stored in the ROM 52. The ROM 52 stores a program and data required for operating the CPU 51 and data such as character codes and fonts required for printing. The RAM 53 is used as a work area for the CPU 51, and is also used to temporarily store data received from the external host apparatus or to develop document data. The interface 57 transfers data to the external host apparatus and receives data from the external host apparatus. The CPU 51, the ROM 52, the RAM 53, the interface 57, the operation panel 58 and the control circuit 54 are connected to each other by a bus BUS composed of an address bus, a data bus, a control bus and the like. In addition, the CPU 51 has a built-in clock circuit (not shown), which generates a clock signal 66 for determining the timing of an operation. The clock signal is supplied also to the control circuit 54.

The image formation part 59 includes a drive part 56 and a drive circuit 55. The drive part 56 includes drive units including a print head for printing on a recording medium, a CR motor for moving a carriage (CR) mounting the print head in the direction of the recording medium width, and a paper feed (PF) motor for feeding the recording medium a certain amount at a time. The drive circuit 55 drives the respective drive units of the image formation part 59, based on a control signal supplied from the control circuit 54.

This printing apparatus comprises a logic power supply 61 for supplying electric power to circuits belonging to a logic system which deal with a digital signal, and a drive power supply 60 for supplying electric power to units which need a relatively large amount of power, such as a motor. The logic power supply 61 and the drive power supply 60 are provided with voltages of 5 volts DC and 24 volts DC, respectively, from a power supply unit 63 connected to a utility electric power network not via a switch or the like. The drive power supply 60 supplies electric power to the image formation part 59 via a power supply line Vcc3.

On the other hand, the logic power supply 61 outputs a voltage of 5 volts DC, which is suitable to a TTL, a CMOS, etc., to a power supply line Vcc1 to feed electric power to the CPU 51, the ROM 52, the RAM 53, the interface 57, the operation panel 58, the control circuit 54, and a power cutoff circuit 62 composed of a relay. Further, a portion of the power supply line Vcc1 serves as a power supply line Vcc2 via the power cutoff circuit 62, and is connected to portions of the operation panel 58 and the control circuit 54. The power cutoff circuit 62 supplies electric power to the power supply line Vcc2 when a power save signal 67 from the control circuit 54 is of a high level, while cutting off the power supply to the power supply line Vcc2 when the power save signal 67 is of a low level.

FIG. 12 is a block diagram showing an example of the interface 57. The external host apparatus 50 and the interface 57 are connected to each other via a connector 71. The interface 57 is of a parallel interface scheme which complies with Centronix standard, in this example. Signal lines typically specified for the interface scheme are lines for data signals Data 1 through 8 (positive logic), a busy signal BUSY (positive logic), a strobe signal STROBE (negative logic), an acknowledge signal ACK (negative logic), etc.

A data latch circuit 72, which stores printing codes and printing control codes supplied from the external host apparatus 50 via the data signals Data 1 through 8 in units of eight bits, latches the data when the strobe signal falls. A busy flag 73, which is composed of a flip-flop, etc., changes to a high level one when the strobe signal falls, and is outputted as it is to the external host apparatus 50 as a busy signal while at the same time being supplied to the CPU 51 via a general-purpose input/output circuit (I/O) 74. The external host apparatus 50 always monitors the busy signal, standing by to transfer the next data until the level of the busy signal becomes low. When data which has been latched in the data latch circuit 72 are supplied to the CPU 51 via a bus, the CPU 51 outputs a clear signal CLEAR via the general-purpose input/output circuit 74 to invert the level of the busy flag 73 to the low level. The CPU 51 includes a timer TA for measuring time.

FIG. 13 is a flow chart showing an operation of the conventional printing apparatus. First, when the power supply of the printing apparatus is turned on, the RAM 53, the interface 57, the operation panel 58 and the control circuit 54 are initialized at step S101. Next, at step S102, the drive circuit 55 and the drive part 56 are operated via the control circuit 54 to conduct initialization operation for initializing a printing position, a printing condition, etc., so that the printing apparatus enters a printing standby state. When under the state, the printing apparatus receives a print instruction from the external host apparatus 50, the printing apparatus can start printing.

Next, at step S103, the timer TA is started. Whether print data are inputted from the external host apparatus 50 is judged at step S104, based on the state of the busy flag 73. The apparatus proceeds to step S110 in the case where print data are not inputted, and thus processing at steps S104 and S110 is repeated until a predetermined length of time elapses from the start of measuring time with the timer TA.

On the other hand, in the case where it is judged at step S104 that print data are inputted from the external host apparatus 50, the apparatus proceeds to step S105 to stop the timer. Document data are then developed at step S106 on the basis of the received data which are stored in the RAM 53, and the drive circuit 55 and the drive part 56 are operated via the control circuit 54, whereby printing onto a recording medium is executed. Whether printing of one line is completed is judged at step S107, and whether there are data to be printed is judged at step S108, while repeating the series of operations until printing of the received data is completed. When data to be printed are all printed, the timer TA is started again at step S109.

In this manner, a certain length of time is measured from the end of the initial operation or the last printing operation, and whether new data to be printed are received during the certain length of time is monitored. When the certain length of time elapses after it is judged that there are no data to be printed, the apparatus proceeds to step S111 to stop the timer. The operation of the drive circuit 55 is stopped at step S112, so that almost no electric power is consumed at the image formation part 59. Consequently, electric current application to the CR motor, the PF motor and the like is all shut off, whereby a relatively large amount of power can be saved at this stage.

At the next step S113, the power save signal 67 is set at the low level to cut off power supply to the power supply line Vcc2. At this stage, electric current application to a part of the operation panel 58 such as the LED display and to a part of the control circuit 54 is shut off, whereby power consumption is reduced at a part of the logic system. At the next step S114, the standby state continues until data to be printed is inputted from the external host apparatus 50 the same as at the step S104.

When data entry is resumed, at step S115 the power save signal 67 is set at the high level to resume power supply to the power supply line Vcc2. The apparatus returns to step S101 to initialize the logic system and the drive system again in order to prepare for printing.

In this way, in the case where the state in which there are no data to be printed continues for a certain length of time, electric current application to a part of the logic system and to the drive system is shut off, whereby power saving control is achieved.

FIG. 14 is a circuit diagram showing an example of a method of connecting the external host apparatus and the printing apparatus. The circuit diagram shows an equivalent circuit of an input signal in the case where power supply to the external host apparatus is cut off but power supply to the printing apparatus is continued. The external host apparatus 50 and the printing apparatus are connected to each other via the connector 71. An input buffer Q1 (e.g., TTL-IC model No. "LS14") is provided on the input side of the interface 57. The signal lines are connected to a power supply line (e.g., 5 volts) via a pull-up resistor R1 (e.g., 1.5 kΩ to 4.7 kΩ) to prevent noises. In a similar manner, a pull-up resistor and a pull-down resistor are connected to the signal lines on the output side of the external host apparatus. These resistors can be expressed by a composite impedance Z from a viewpoint of an equivalent circuit.

When the external host apparatus is on, the voltage levels of the signal lines are stable at the high level or the low level depending on an output supplied from the external host apparatus. Meanwhile, when the printing apparatus is not connected to the external host apparatus, the voltage levels of the signal lines stably remain at the high level owing to the pull-up resistor R1. However, when the printing apparatus is connected to the external host apparatus, but the external host apparatus is off and the printing apparatus is on, the output side of the external host apparatus can be regarded as grounded through the composite impedance Z, as shown in FIG. 14. Thus, since the voltage levels of the signal lines are determined by a voltage dividing ratio between the pull-up resistor R1 and the composite impedance Z, the voltage levels are intermediate between the high level and the low level.

FIG. 15A is a graph showing an example of a change of the voltage of the strobe signal. When the external host apparatus 50 is not transferring data under the condition that the external host apparatus 50 and the printing apparatus are connected to each other, the strobe signal is maintained at the high level (i.e., 5 volts in FIG. 15A). When the power supply of the external host apparatus is turned off under this condition, the voltage level of the signal decreases exponentially as the power supply voltage decreases, and becomes stable at an intermediate level (about 1.8 volts in FIG. 15A) which is determined by the voltage dividing ratio between the pull-up resistor R1 and the composite impedance Z. Next, when the external host apparatus is turned on again, the voltage level of the signal increases from the intermediate level toward the high level, and becomes stable at a constant voltage.

Since the composite impedance Z has a constant value when the external host apparatus is in off state, the voltage of the signal exists within an intermediate level range of 1.5 volts to 4 volts in general. In the case where the input buffer Q1 is a TTL-IC, a threshold value of the low level exists within the range from 0.8 volts to 1.1 volts. Hence, the strobe signal level does not change to the low level even in the case where the external host apparatus is turned off, whereby the printing apparatus is prevented from receiving data by mistake.

FIG. 15B is a graph showing another example of a change of the voltage of the strobe signal. The external host apparatus 50, depending on the type thereof, may output a low level voltage (about 0.2 volt in FIG. 15B) for a moment, when the power supply of the external host apparatus is turned on or off. It is assumed as the cause of this that power-on-reset is activated when the power supply of the external host apparatus is turned on or off, and thus the strobe signal level is switched to the low level for a moment. As shown from the waveform in FIG. 15B, it is difficult to distinguish the waveform in FIG. 15B from the waveform of the strobe signal as the printing apparatus receives during the normal data transfer. Therefore, the printing apparatus receives wrong data from the data signals Data 1 through 8 when the external host apparatus is turned on or off.

The waveform of the strobe signal in turning off of the external host apparatus, in particular, drops down to almost 0 volts and then abruptly shows a steep increase. The pulse width of the signal, although affected by the capacitance of the power supply of the external host apparatus and a characteristic of an output buffer, is a few hundred microseconds in some cases. Further, the curve expressing the change in voltage has a small peak at a voltage a little higher than a voltage determined by the voltage dividing ratio. In the case where this peak voltage does not exceed a high level threshold value of the input buffer Q1, it is judged that the level of the strobe signal still remains low until the external host apparatus is turned on again.

Meanwhile, it is to be noted that usually when a user turns off the power supply of the external host apparatus, the user turns off the power supply of the printing apparatus as well; this problem has been disregarded.

However, the printing apparatuses shown in FIGS. 11 through 13 have a function to enter the power saving mode when data transfer from the external host apparatus is discontinued for a predetermined length of time and to exit the power saving mode when data transfer is resumed. Hence, when such a printing apparatus is connected to the external host apparatus as described above, the printing apparatus in the power saving mode exits this mode whenever the level of the strobe signal is inverted every turn on or off of the external host apparatus. Such behavior is not desirable.

Further, in the case where a user turns off only the external host apparatus while the printing apparatus is in a normal print waiting mode, expecting that the power saving mode will be invoked as time passes by, the printing apparatus receives one byte of wrong data in response to inversion of the level of the strobe signal. Since the power saving mode will not be invoked as long as the RAM still stores data which have yet to be printed, even after a certain length of time (See step S108 in FIG. 13), the printing apparatus will remain in the state that an electric current flows therein.

SUMMARY OF THE INVENTION

An object of the invention is to provide a printing apparatus which judges the on-off status of a power supply of an external host apparatus without fail.

Another object of the invention is to provide a printing apparatus which prevents wrong data reception regardless of the type of an external host apparatus.

Still another object of the invention is to provide a printing apparatus which stably enters and exits a power saving mode.

The invention includes a printing apparatus comprising:
an interface for receiving a host side signal outputted from an external host apparatus;
an image formation means for forming an image on a recording medium; and
a main controller for transmitting and receiving a signal between the interface and the image formation means and processing the signal in accordance with a predetermined program.

The printing apparatus further comprising a voltage monitor for monitoring the voltage of the host side signal, wherein it is judged that a power supply of the external host apparatus is in a turned-off state when the voltage of the host signal is equal to or lower than a first reference voltage and is equal to or higher than a second reference voltage.

According to the invention, the voltage of the host side signal is monitored and then compared with the two reference voltages, and therefore, it is possible to detect the voltage of the host side signal even when the voltage is of an intermediate level which belongs to neither a high level nor a low level. Hence, when the host side signal is equal to or lower than the first reference voltage and is equal to or higher than the second reference voltage, it is possible to steadily and quickly detect that power supply to the external host apparatus is cut off. Additionally, a signal to be monitored as a host side signal may be, instead of the strobe signal, a signal whose voltage stays at the high level or the low level certainly when the external host apparatus is on but changes to the intermediate level when power supply to the external host apparatus is cut off.

The invention also includes a printing apparatus comprising:
an interface for receiving a host side signal outputted from an external host apparatus;
an image formation means for forming an image on a recording medium; and
a main controller means for transmitting and receiving a signal between the interface and the image formation means and processing the signal in accordance with a predetermined program.

The printing apparatus further comprising a voltage monitor for monitoring the voltage of the host side signal; and
a timer for measuring an elapsed time after inversion of the level of the host side signal, wherein
it is judged that a power supply of the external host apparatus is in a turned-off state, when the voltage of the host side signal is equal to or lower than a first reference voltage set higher than a logical threshold value after an elapsed predetermined length of time after inversion of the host side signal.

According to the invention, the voltage of the host side signal is monitored and then compared with the first reference voltage set higher than the logical threshold value, and therefore, it is possible to certainly detect a state that the voltage of the host side signal exists within the intermediate level range. Further, since an output from the voltage monitoring means is judged after an elapsed predetermined length of time after inversion of the level of the host side signal, it is possible to clearly judge whether the inversion of the level of the host side signal is attributed to data transfer or to changeover of the power status of the external host apparatus.

It is preferable in the invention that the first reference voltage is automatically adjustable. That is, since the first reference voltage is automatically adjustable, in the case where the impedance on the output side of the external host apparatus varies dependently on the type of the external host apparatus, it is possible to set a reference voltage with which reliable judgment is realized.

The invention further includes a printing apparatus comprising:

an interface for receiving a host side signal including a data signal, outputted from an external host apparatus;

an image formation means for forming an image on a recording medium; and a main controller for transmitting and receiving a signal between the interface and the image formation means and processing the signal in accordance with a predetermined program.

The printing apparatus further comprising a voltage monitor for monitoring a change in the level of the host side signal and comparing the host side signal with a reference level higher than a threshold value level of other signals; and a timer for measuring an elapsed time after inversion of the level of the host side signal, wherein a data signal is received in the case where the host side signal is higher than the reference level after an elapsed predetermined length of time after inversion of the level of the host side signal.

According to the invention, since the voltage monitor monitors a change in the level of the host side signal such as a strobe signal, using the reference level higher than the threshold value level of other signals, it is possible to detect a state that the voltage of the host side signal is of an intermediate level. Hence, by judging an output from the voltage monitor after an elapsed certain length of time after inversion of the host side signal level, it is possible to judge whether the inversion of the host side signal level is attributed to data transfer or to changeover of the power status of the external host apparatus.

That is, while the level of the host side signal such as a strobe signal changes in a very short period of the order of a few microseconds in the case of data transfer, in the case of changeover of the power status of the external host apparatus, the period of the level change of the host side signal continues from a few seconds to a few hours. Hence, by sensitively detecting a change of the host side signal level and by comparing the periods in which the level change continues, it is possible to identify the meaning of the signal and prevent improper entry of the data signal.

The invention also includes a printing apparatus comprising:

an interface for receiving a host side signal including a data signal, outputted from an external host apparatus;

an image formation means for forming an image on a recording medium; and a main controller for transmitting and receiving a signal between the interface and the image formation means and processing the signal in accordance with a predetermined program.

The printing apparatus further comprising a power supply controller for stopping or restricting power supply in response to an instruction from the main controller, and a voltage monitor for monitoring a change in the level of the host side signal and comparing the host side signal with a reference level higher than a threshold value level of other signals, wherein when a signal input from the external host apparatus is discontinued for a predetermined length of time, the power supply controller means operates and a power saving mode is entered, and when a signal input from the external host apparatus is resumed, the power saving mode is released, and in the power saving mode, an output of the voltage monitor is judged after an elapsed predetermined length of time after resumption of a signal input from the external host apparatus and the power saving mode is released in the case where the host side signal is higher than the reference level.

According to the invention, under the condition that the printer has entered the power saving mode, the output from the voltage monitor is judged after an elapsed predetermined length of time after resumption of inputting of the signal from the external host apparatus, and therefore, it is possible to judge whether the inversion of the level of the host side signal is attributed to data transfer or to changeover of the power status of the external host apparatus, as described above.

In the case where the host side signal remains at the high level after the predetermined length of time has elapsed, it is judged that the inversion of the level is attributed to normal data transfer, so that the power saving mode is released. On the other hand, in the case where the host side signal is still at the low level after the predetermined length of time has elapsed, it is judged that the inversion of the level is attributed to changeover of the power status of the external host apparatus, so that the power saving mode continues. Thus, it is possible to reliably enter and exit the power saving mode.

It is preferable in the invention that the voltage monitor is a comparator or an analog-to-digital converter. That is, in the case where a comparator or an analog-to-digital convertor is used as the voltage monitor, it is possible to accurately and quickly monitor a change in the voltage of the host side signal.

BRIEF DESCRIPTION OF THE DRAWINGS

Other and further objects, features, and advantages of the invention will be more explicit from the following detailed description taken with reference to the drawings wherein:

FIG. 14 is a circuitry diagram showing an example of a method of connecting an external host apparatus and the printing apparatus, more precisely, a view of an equivalent circuit of an input signal where the power of the external host apparatus is off but the power of the printing apparatus is on;

FIG. 15A is a graph showing an example of a change in the voltage of a strobe signal;

FIG. 15B is a graph showing another example of a change in the voltage of the strobe signal; and FIG. 15C is a graph showing a waveform outputted from a comparator 15a according to the invention.

DESCRIPTION OF THE PREFERRED EMBODIMENTS

Figure 1:
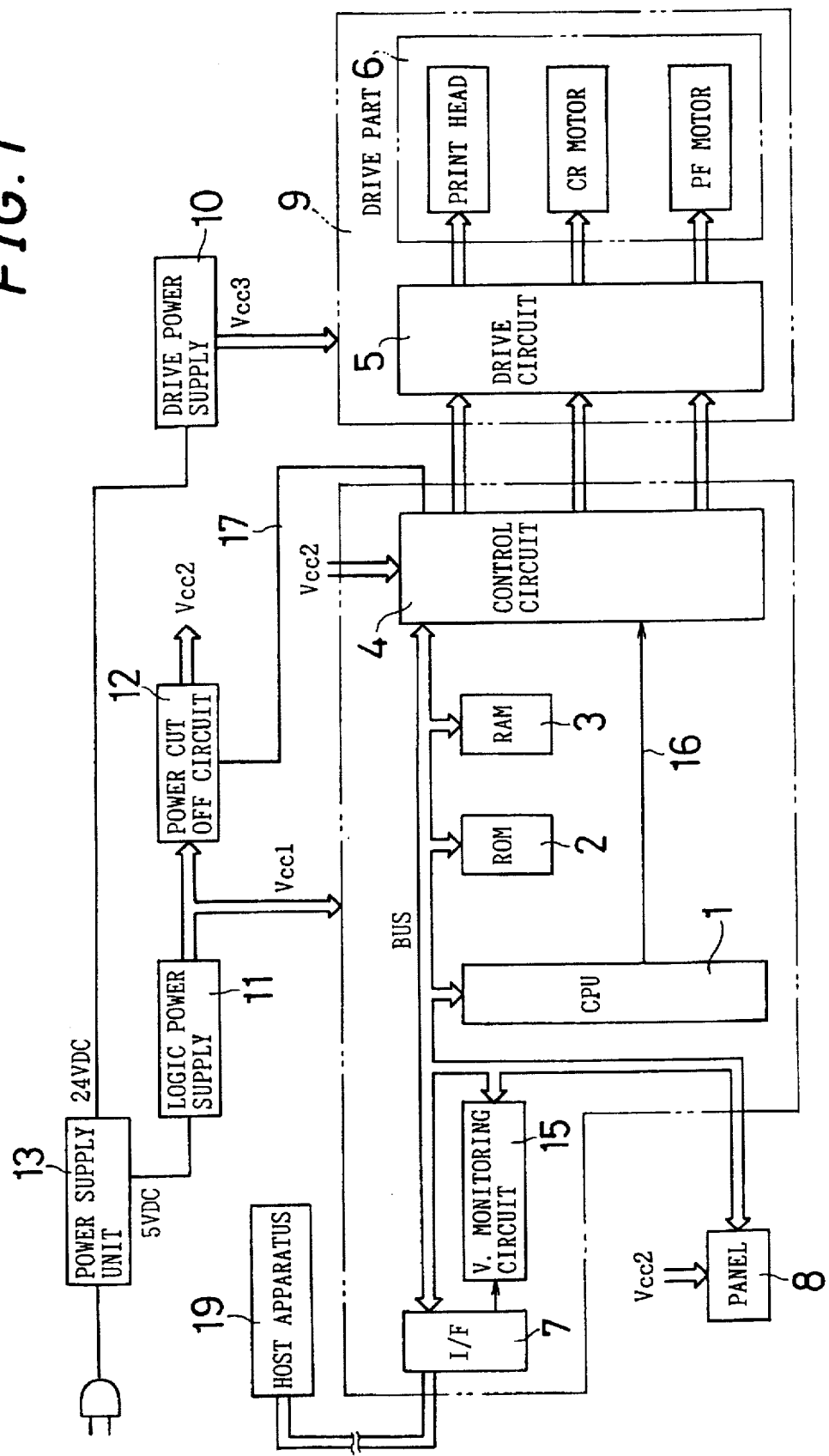
FIG. 1 is a block diagram showing an example of an electric structure of a printing apparatus of an embodiment of the invention.

Now referring to the drawings, preferred embodiments of the invention are described below.

<First Embodiment>

FIG. 1 is a block diagram showing an example of an electric structure of an embodiment of the invention. This printing apparatus comprises a CPU (central processing unit) 1 for managing an operation of the apparatus as a whole, a ROM (read only memory) 2 for serving as a nonvolatile memory, a RAM (random access memory) 3 capable of reloading data, an interface (I/F) 7 for connecting to an external host apparatus 19, an operation panel 8 incorporating signal input means such as an operation switch, and signal display means such as an LED (light emitting diode) display and a buzzer, an image formation part 9 for forming an image on a recording medium, and a control circuit 4 for controlling the image formation part 9.

In accordance with the program stored in the ROM 2, the CPU 1 performs signal processing, such as data input and output, data transfer, and arithmetic operation. The ROM 2 stores programs and data which is necessary for operating the CPU 1 and data which is necessary for printing, such as a character code, a character font, etc. The RAM 3 is used as a work area for the CPU 1, and is also used to temporarily store data received from the external host apparatus 19 or to develop document data. The interface 7 transfers data to the external host apparatus 19 and receives data from the external host apparatus 19. Further, the interface 7 is provided with a voltage monitoring circuit 15 which monitors a change in the level of a strobe signal.

The CPU 1, the ROM 2, the RAM 3, the interface 7, the operation panel 8 and the control circuit 4 as mentioned above are connected to each other by a bus BUS composed of an address bus, a data bus, a control bus and the like. In addition, the CPU 1 includes a built-in clock circuit (not shown) which generates a clock signal 16 for defining an operating timing, and the clock signal 16 is supplied to the control circuit 4 as well.

The image formation part 9 comprises a drive part 6 and a drive circuit 5. The drive part 6 includes drive units such as a printing head for printing on a recording medium, a CR motor for moving a carriage (CR) mounting the printing head, in a direction along the width of the recording medium, a PF (paper feed) motor for feeding the recording medium by a certain amount. The drive circuit 5 drives the respective drive units of the image formation part 9 in accordance with a control signal supplied from the control circuit 4.

This printing apparatus comprises a logic power supply 11 for supplying power to circuits belonging to a logic system which deal with a digital signal, and a drive power supply 10 for supplying power to units such as a motor which need a relatively large power. The power sources receive a direct current voltage of 5 volts, for example, and a direct current voltage of 24 volts, for example, respectively, from a power supply unit 13 connected to a utility electric power network not via a switch or the like. The drive power supply 10 supplies power to the image formation part 9, on a power supply line Vcc3.

On the other hand, the logic power supply 11 outputs a direct current of 5 volts, which is suitable to a TTL, a CMOS, etc., to a power supply line Vcc1, to feed electric power to the CPU 1, the ROM 2, the RAM 3, the interface 7, the operation panel 8, the control circuit 4, and a power cutoff circuit 12 composed of a relay. Further, a portion of the power supply line Vcc1 nerves as a power supply line Vcc2 via the power cutoff circuit 12, and is connected to portions of the operation panel 8 and the control circuit 4. The power cutoff circuit 12 supplies electric power to the power supply line Vcc2 when a power save signal 17 from the control circuit 4 is of a high level, but power supply to the power supply line Vcc2 is cut off when the power save signal 17 is of a low level.

Figure 2:
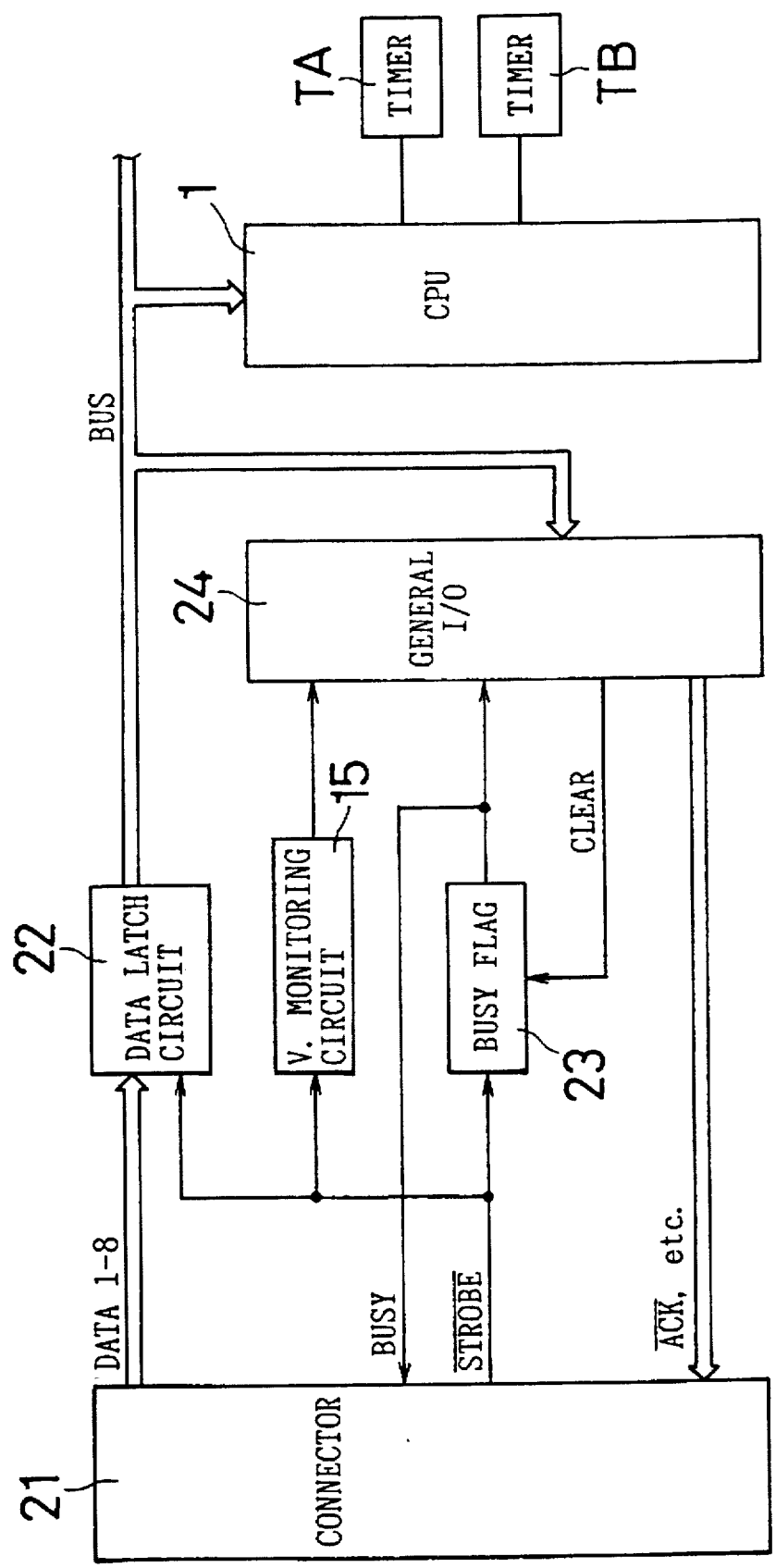
FIG. 2 is a block diagram showing an example of an interface 7 in relation to the invention.

FIG. 2 is a block diagram showing an example of the interface 7. The external host apparatus 19 and the interface 7 are connected to each other via a connector 21. The interface 7 is of a parallel interface scheme according to a standard much as the Centronix standard in this example. Signal lines typically specified for the interface are lines for data signals Data 1 through 8 (positive logic), a busy signal BUSY (positive logic), a strobe signal STROBE (negative logic), an acknowledge signal ACK (negative logic), etc.

A data latch circuit 22 stores printing codes and printing control codes in units of eight bits, which are supplied from the external host apparatus 19 through the data signals Data 1 through 8, and latches the data when the strobe signal fails. A busy flag 23, which is formed by a flip-flop, etc., changes to a high level one when the strobe signal fails, and is outputted as a busy signal as it is to the external host apparatus 19 while at the same time being supplied to the CPU 1 via a general purpose input/output circuit (I/O) 24. The external host apparatus 19 always monitors the busy signal, standing by to transfer the next data until the busy signal, becomes a low level one. When data latched in the data latch circuit 22 is supplied to the CPU 1 via the bus, the CPU 1 outputs a clear signal CLEAR via the general purpose input/output circuit 24 to invert the busy flag 23 into a low level one. The CPU 1 includes a timer TA and a timer TB for measuring time.

Further, the voltage monitoring circuit 15 for monitoring a change in the level of a strobe signal is provided, whose output is supplied to the CPU 1 via the general purpose input/output circuit 24.

Figure 3:
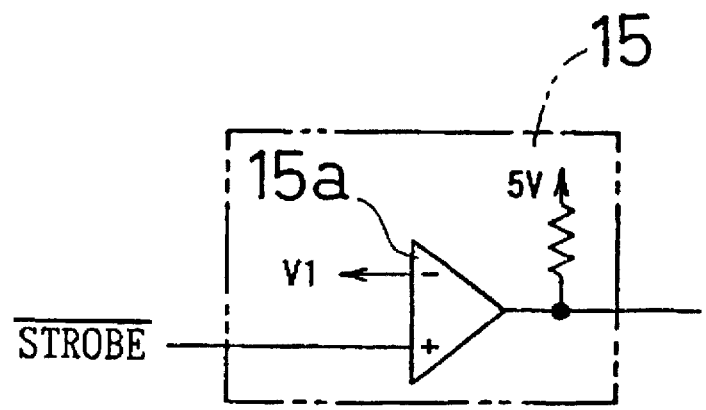
FIG. 3 is a circuitry diagram showing an example of a voltage monitoring circuit 15.

FIG. 3 is a circuitry diagram showing an example of the voltage monitoring circuit 15. The voltage monitoring circuit 15 includes a comparator 15a which monitors the strobe signal and compares the strobe signal with a reference voltage V1 higher than a threshold value level of other signals.

The comparator 15a for comparing the strobe signal with the reference voltage V1 is disposed to monitor a change in the voltage level of the strobe signal, and an output in an open collector type from the comparator 15a is pulled up to a power supply line. The reference voltage V1, which is set, for example, around 4 volts, is supplied from a reference power supply (not shown).

1) When the voltage of the strobe signal is higher than the reference voltage V1, the output from the comparator 15a becomes a low level one, and 2) when the voltage of the strobe signal is lower than the reference voltage V1, the output from the comparator 15a becomes a high level one. The output is read by the CPU 1 via the general purpose input/output circuit 24.

Figure 4:
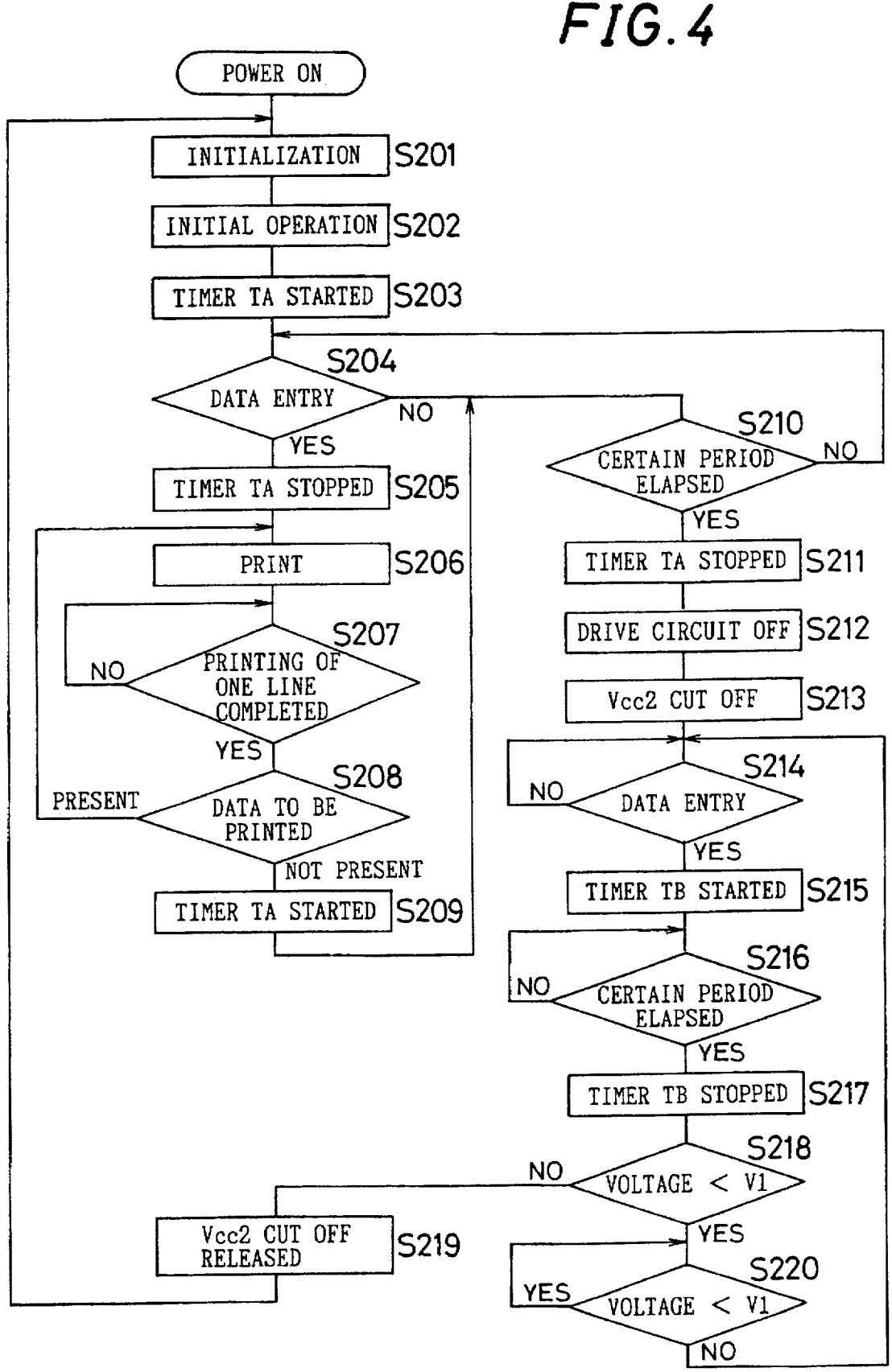
FIG. 4 is a flow chart showing an operation of the printing apparatus of the invention.

FIG. 4 is a flow chart showing the operation of a printing apparatus of the invention. First, when the power supply of the printing apparatus is turned on, at step S201 the RAM 3, the interface 7, the operation panel 8 and the control circuit 4 are initialized. Next, at step S202, the drive circuit 5 and the drive part 6 are operated via the control circuit 4 to initialize a printing position, a printing condition, etc., so that the printing apparatus enters a printing standby state. When the printing apparatus receives a print instruction from the external host apparatus 19 under the printing standby state, the printing apparatus can start printing.

Next, at step S203 the timer TA is started. At step S204 whether print data are inputted from the external host apparatus 19 is judged on the basis of the condition of the busy flag 23. The printing apparatus proceeds to step S210 in the case where no data is inputted, and step S204 and step S210 are repeated until a certain length of time elapses since the timer TA started measuring time.

On the other hand, in the case where data is inputted from the external host apparatus 19 at step S204, the printing apparatus 19 proceeds to step S205 to stop the timer TA. Document data is then developed at step S206 on the basis of the inputted data stored in the RAM 3, and the drive circuit 5 and the drive part 6 are operated via the control circuit 4 so that printing onto a recording medium is executed. At step S207, whether printing of one line has been completed is judged, and further whether data to be printed are present or not is judged at step S208, while repeating the series of operations until printing the received data is completed. When data to be printed is exhausted, at step S209 the timer TA is started again.

In this manner, a predetermined length of time is measured from the time of completion of the initialization or the last printing, and during the predetermined length of time whether new print data is received is monitored. When the predetermined length of time has elapsed since it is judged that data to be printed has been exhausted, the printing apparatus proceeds to step S211 to stop the timer TA. At step S212, the operation of the drive circuit 5 is stopped, so that a power consumption of the image formation part 9 becomes almost zero. Thus, power supply to the CR motor, the PF motor etc. is all cut off, whereby it is possible to save power to a relatively great extent at this stage.

At the next step S213, the level of the power save signal 17 is set low to cut off power supply to the power supply line Vcc2. At this stage, power supply to a portion of the operation panel 8 such as the LED display, and a portion of the control circuit 4 is cut off to reduce the power consumption for a portion of the logic system. At the next step S214, the same as at step 204, the printing apparatus stands by for the next input of data to be printed from the external host apparatus 19.

When data entry is resumed, the timer TB is started at step S215. After the printing apparatus stands by for a predetermined length of time at step S216, at step S218 the output from the comparator 15a of the voltage monitoring circuit 15 is judged.

It is preferable that the reference voltage V1 of the comparator 15a is preferably set in such a manner that the turn on-off status of the power supply of the external host apparatus are clearly distinguished. Further, as shown in FIGS. 15A and 15B, in the case of a logic circuit which operates with 5 volts to 0 volt, it is preferable to set the reference voltage V1 to exist within the range of 4 volts (80%) to 4.5 volts (90%), considering a change in the power supply voltage.

FIG. 15C is a graph showing a waveform outputted from the comparator 15a. The signal level of the strobe signal, as shown in FIGS. 15A and 15B, passes 4 volts, both when the power of the external host apparatus is turned on and off, so that the signal level can be clearly detected if the reference voltage is set at 4 volts.

Further, the time measured by the timer TB at step S216 is preferably set about 300 microseconds allowing a margin, in order to distinguish from inversion of the level of the strobe signal due to normal data transfer.

At step S218, when the voltage of the strobe signal remains still lower than the reference voltage V1 even after a predetermined length of measurement time has elapsed from the start of the data entry at step S214, it is judged that the power supply of the external host apparatus 19 has been turned off and the printing apparatus proceeds to step S220. Whether the voltage of the strobe signal is lower than the reference voltage V1 is judged also at step S220, and in the case where the voltage of the strobe signal is lower than the reference voltage V1, it is judged that the power supply for the external host apparatus remains in off-state and the apparatus is still in standby state. In the case where the voltage of the strobe signal is equal to or higher than the reference voltage V1, the printing apparatus proceeds to step S214 to remain in the power saving mode and waits for data entry.

On the other hand, when the voltage of the strobe signal is equal to or higher than the reference voltage V1 at step S218, the pulse width of the strobe signal is shorter than the predetermined length of measurement time at the start of data entry at step S214, and therefore, it is judged that the level of the strobe signal was inverted due to data transfer. Then, the printing apparatus proceeds to step S219 to exit the power saving mode, the power save signal 17 is set at the high level and power supply to the power supply line Vcc2 is resumed. The apparatus then returns to step S201, initializing the logic system and the drive system again for preparation for printing.

Thus, in the case where the state that no data to be printed is present continues for a predetermined length of time at step S204, power supply to a portion of the logic system and the drive system is cut off, thereby realizing power save control. Further, in the power saving mode, since both the change in the level and the period of the strobe signal are monitored at step S214 to step S218, it is possible to surely continue or release the power saving mode, independently of the type of the external host apparatus.

Although the foregoing has described the example in which malfunction under the power saving mode is prevented, when the printing apparatus is in the normal printing standby state as well, by using the judgment method of step S214 to step S218, it is possible to identify whether a change in the level of the strobe signal is attributed to the status of the power supply of the external host apparatus or attributed to normal data transfer, and hence, it is possible to prevent improper data transfer without fail.

In addition, though two timers TA and TB are used to measure an elapsed time in the example described above, only one timer which functions as the two timers may be used. Moreover, although the foregoing shows the example which uses the comparator 15a as the voltage monitoring circuit 15, an analog-to-digital convertor may be used alternatively.

Further, although the example described above uses a mechanical switch such as a relay as the power cutoff circuit 12, the invention is applicable to a power save method in which instead of using the switch, the CPU 1 is maintained in a HALT condition or the clock signal 16 which is supplied to the respective parts is stopped to suppress power consumption in the peripheral circuits and the drive units.

<Second Embodiment>

Figure 5:
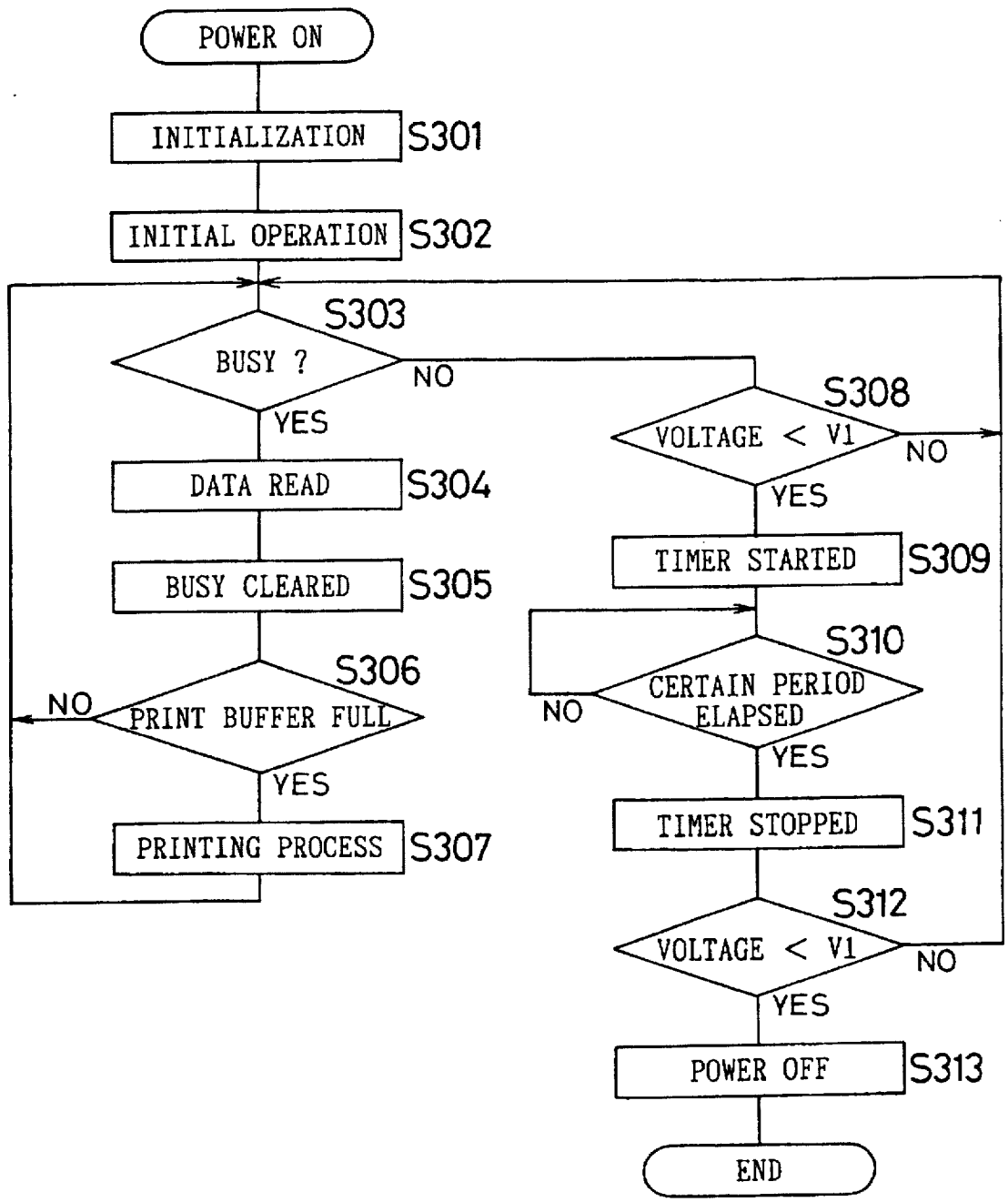
FIG. 5 is a flow chart showing another example of the operation in the structure of FIGS. 2 and 3.

FIG. 5 is a flow chart showing another example of the operation in the structure of FIGS. 2 and 3. First, when the power supply of the printing apparatus is turned on, the RAM 3, the interface 7, the operation panel 8 and the control circuit 4 are initialized at step S301. Next, at step S302, the drive circuit 5 and the drive part 6 are operated via the control circuit 4 to initialize a printing position, a printing condition, etc., so that the printing apparatus enters the printing standby state. When the printing apparatus receives a print instruction from the external host apparatus 19 under this state, the printing apparatus can start printing.

Next, at step 9303, whether the busy flag 23 is set is judged to detect whether there is a change in the level of the strobe signal. In the case where the busy flag 23 is set up, judging that there was data entry, the printing apparatus proceeds to step S304 to read received data which is latched by the data latch circuit 22 and store the data in a print buffer of the RAM 3. After clearing the busy flag 23 at next step S305, at subsequent step S306, whether a print start condition is satisfied, e.g., whether the print buffer is full with data, is judged. Step S303 through step S306 are repeated until the print start condition is satisfied. In the case where the print start condition is satisfied, data stored in the print buffer is developed into a dot pattern at step S307 and the image formation part 9 is driven so that the data is printed on a recording medium. Then the apparatus returns to step S303.

On the other hand, in the case where the busy flag 23 is not set up at step S303, at step S308 an output from the comparator 15a is read via the general purpose input/output circuit 24. When the voltage of the strobe signal is not lower than the reference voltage V1, the apparatus returns to step S303 and remains in the loop until the busy flag 23 is set. In the case where the voltage of the strobe signal is lower than the reference voltage V1, the timer TA is started at step S309, and at step S310, the apparatus stands by until the predetermined length of time elapses. Since the pulse width of the strobe signal is generally a few microseconds, the waiting time is set around 300 microseconds allowing a margin. After the certain length of time, the timer TA is stopped at step S311, and the voltage in confirmed once again at step S312. In the case where the voltage of the strobe signal is higher than the reference voltage V1, there is a possibility that data was received, and therefore, the apparatus returns to step S303. However, in the case where the voltage of the strobe signal is lower than the reference voltage V1 even after the certain length of time, judging that thin is because the external host apparatus 19 was turned off, the printing apparatus proceeds to step S313 to switch the level of the power save signal 17 to the low level, operate the power cutoff circuit 12, and stop power supply to the power supply line Vcc2.

Thus, during the absence of data transfer, the voltage of the strobe signal is always compared with the reference voltage V1 which is set higher than the logical threshold value, to monitor turning off of the power supply of the external host apparatus 19. In the case where there is a possibility that the host apparatus 19 was turned off, the voltage of the strobe signal is confirmed again after the certain length of time. Hence, it is possible to surely detect a state in which the voltage level of the host side signal is intermediate.

<Third Embodiment>

Figure 6:
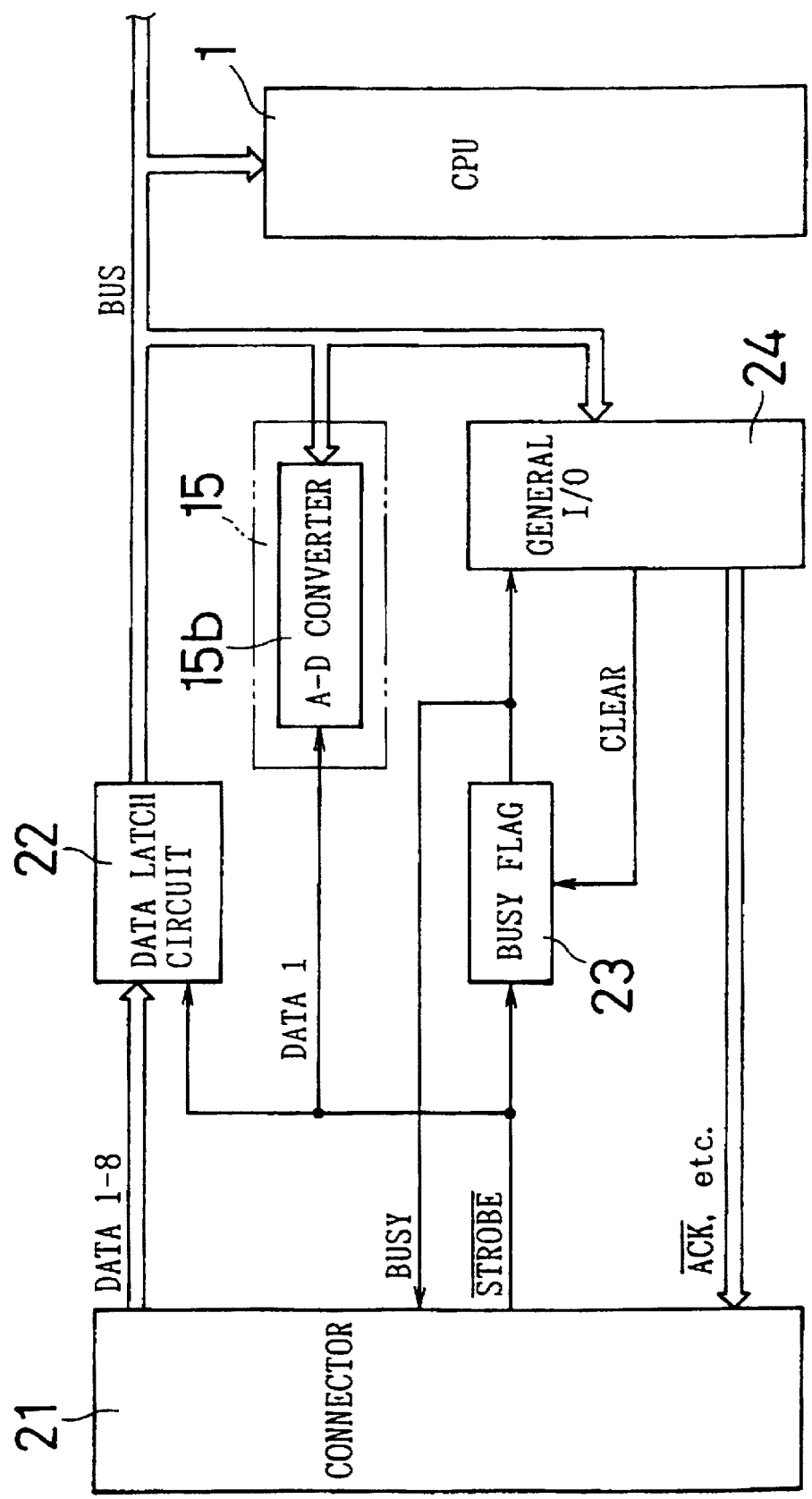
FIG. 6 is a block diagram showing an interface 7 in relation to another embodiment of the invention.

FIG. 6 is a block diagram showing the interface 7 of another embodiment of the invention. The external host apparatus 19 and the interface 7 are connected to each other via the connector 21. The interface 7 is of a parallel interface scheme which complies with the Centronix standards in this example. Signal lines typically specified for the interface are lines for data signals Data 1 through 8 (positive logic), a busy signal BUSY (positive logic), a strobe signal STROBE (negative logic), an acknowledge signal ACK (negative logic), etc.

The data latch circuit 22 stores printing codes and printing control codes in units of eight bits, which are supplied from the external host apparatus 19 through the data signals Data 1 through 8, and latches the data when the strobe signal falls. The level of the busy flag 23, which is formed by a flip-flop, etc., becomes high when the strobe signal falls, and is outputted as such to the external host apparatus 19 as a busy signal while at the same time being supplied to the CPU 1 via the general purpose input/output circuit (I/O) 24. The external host apparatus 19 always monitors the busy signal, standing by to transfer the next data until the level of the busy signal becomes low. When data latched in the data latch circuit 22 is supplied to the CPU 1 via a bus, the CPU 1 outputs a clear signal CLEAR via the general purpose input/output circuit 24 to invert the level of the busy flag 23 to the low level.

Further, to monitor a change in the voltage level of the strobe signal, the voltage monitoring circuit 15 including an A/D convertor (analog-to-digital convertor) 15b of, for example, 8-bit structure is disposed, and a digital output is supplied to the CPU 1 via the bus. The A/D convertor 15b may be of a serial conversion type.

Figure 7:
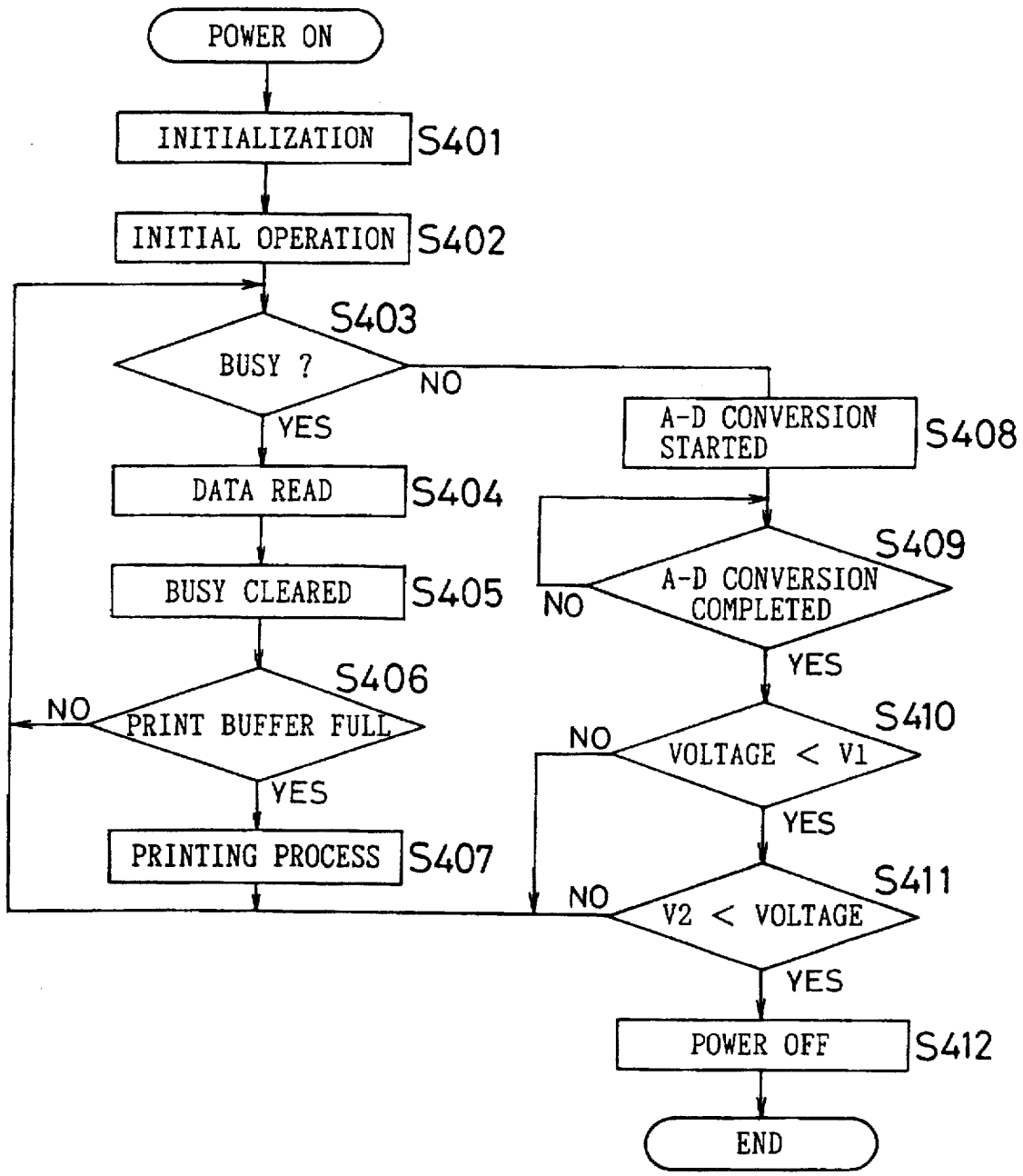
FIG. 7 is a flow chart showing an operation in the structure of FIG. 6.

FIG. 7 is a flow chart showing an operation in the structure of FIG. 6. First, when the power supply of the printing apparatus is turned on, the RAM 3, the interface 7, the operation panel 8 and the control circuit 4 are initialized at step S401. Next, at step S402, the drive circuit 5 and the drive part 6 are operated via the control circuit 4 to initialize a printing position, a printing condition, etc., so that the printing apparatus enters the printing standby state. When the printing apparatus receives a print instruction from the external host apparatus 19 under this state, the printing apparatus can start printing.

Next, at step S403, whether the busy flag 23 is set up is judged to detect whether there is a change in the level of the strobe signal. In the case where the busy flag 23 is set, judging that there was data entry, the printing apparatus proceeds to step S404 to read received data which are latched by the data latch circuit 22 and store the data in a print buffer of the RAM 3. After clearing the busy flag 23 at the next step S405, at subsequent step S406 whether a print start condition is satisfied, e.g., whether the print buffer is full with data, is judged. Steps S403 through S406 are repeated until the print start condition is satisfied. In the case where the print start condition is satisfied, data stored in the print buffer are developed into a dot pattern at step S407 and the image formation part 9 is driven so that the data are printed on a recording medium. Then the apparatus returns to step S403.

On the other hand, in the case where the busy flag 23 is not set up at step S403, the apparatus proceeds to step S408, wherein the A/D convertor 15b starts operating. At step S409 the apparatus is in the standby state until A/D conversion is completed. A time needed for A/D conversion is determined by the number of bits of a conversion output and a clock frequency for comparing operation. In the case of eight bits resolution, the waiting time is about 20 microseconds.

Next, at step S410, a digital output from the A/D convertor 15b and a first reference voltage V1 are compared with each other. The value of the first reference voltage V1 is stored in the ROM 2 or the RAM 3 in advance. Since there is a case where the output impedance of the external host apparatus 19 is relatively high, the closer the value V1 is to the power supply voltage of 5 volts, the larger a detection margin for an intermediate voltage becomes. It is preferable considering a change in the power supply voltage to set the value of the first reference voltage V1, for example, at about 4 volts, which is 80% of the power supply voltage.

Since, when the digital output from the A/D convertor 15b is higher than the first reference voltage V1, it can be judged that power is being supplied to the external host apparatus 19, the apparatus returns to step S403 to remain in the printing standby state. When the digital output is equal to or lower than the first reference voltage V1, at step S411 the digital output is compared with a second reference voltage V2. The value of the second reference voltage V2 is stored in the ROM 2 or the ROM 3 in advance. The closer the value V2 is to the ground voltage of 0 volt, the larger the detection margin becomes. It is preferable considering a change in the voltage to set the value of the second reference voltage V2, for example, at about 1 volt, which is 20 of the power supply voltage. Since, when the digital output from the A/D convertor 15b is lower than the second reference voltage V2, it can be judged that the external host apparatus 19 is on, the printing apparatus returns to step S403. When the digital output is equal to or higher than the second reference voltage V2, this means that the voltage of the strobe signal is intermediate between the first reference voltage V1 and the second reference voltage V2. Therefore, it can be judged that power supply to the external host apparatus 19 is turned off, the printing apparatus proceeds to step S412, where the power save signal 17 is set at the low level to cut off power supply to the power supply line Vcc2, whereby the printing apparatus enters the power saving mode.

In the example as shown in FIG. 15B, although there is a possibility that measurement of the voltage of the strobe signal is carried out after the strobe signal has abruptly changed, the busy flag 23 is set up at this stage, and the printing apparatus, after executing step S403 to step S406, proceeds to A/D conversion of step S408 and the subsequent steps. Step S403, step S408 and the subsequent steps are repeated until the voltage of the strobe signal is settled between the first reference voltage V1 and the second reference voltage V2. When the voltage level of the strobe signal becomes intermediate, the printing apparatus proceeds to step S412 so as to enter the power saving mode.

Although the foregoing has described that the voltage of the strobe signal is higher than the first reference voltage V1 when the power supply of the external host apparatus 19 is on, in general, there is an exception where the external host apparatus 19 is transferring data. While the strobe signal voltage is equal to or lower than the first reference voltage V1 when the strobe signal is at the low level during data transfer, since the busy flag 23 is judged prior to A/D conversion, the processing at step S403 to step S406 is executed. During normal data transfer, the next strobe signal is generated so that the busy flag 23 is tip while this processing is executed, and therefore, it is never possible for the printing apparatus to shift into A/D conversion during data transfer. Although there is a possibility that the printing apparatus will shift into A/D conversion by coincidence, since the voltage level of the strobe signal does not become intermediate during data transfer, such a possibility is removed at step S410 or S411.

Thus the voltage of the host side signal is monitored in this manner, and when the voltage is equal to or lower than the first reference voltage V1 and is equal to or higher than the second reference voltage V2, it is possible to steadily and quickly judge that the power supply of the external host apparatus is turned off. In addition, since the voltage is judged in a routine which is different from the routine for receiving data in the present embodiment, receipt of data is fast.

The foregoing has described a case where the power supply of the external host apparatus 19 is on before the power supply of the printing apparatus is turned on. Now, a description will be given on a case where the power supply of the printing apparatus is turned on when the power supply of the external host apparatus 19 is off. In this case, the processing at step S401 and the processing at step S402 are executed in a similar manner, and the busy flag 23 is judged at step S403. Here, since the external host apparatus 19 is off, the busy flag 23 is never set. Following this, the printing apparatus enters step S408 and the subsequent steps so that the voltage level of the strobe signal becomes intermediate, which is equal to or lower than the first reference voltage V1 and is equal to or higher than the second reference voltage V2. Therefore, the power supply of the printer is turned off at step S412. Hence, even in the case where the power supply of the printer is turned on while the external host apparatus is in off-state, the power supply of the printer is turned off without fail after predetermined processing.

<Fourth Embodiment>

Figure 8:
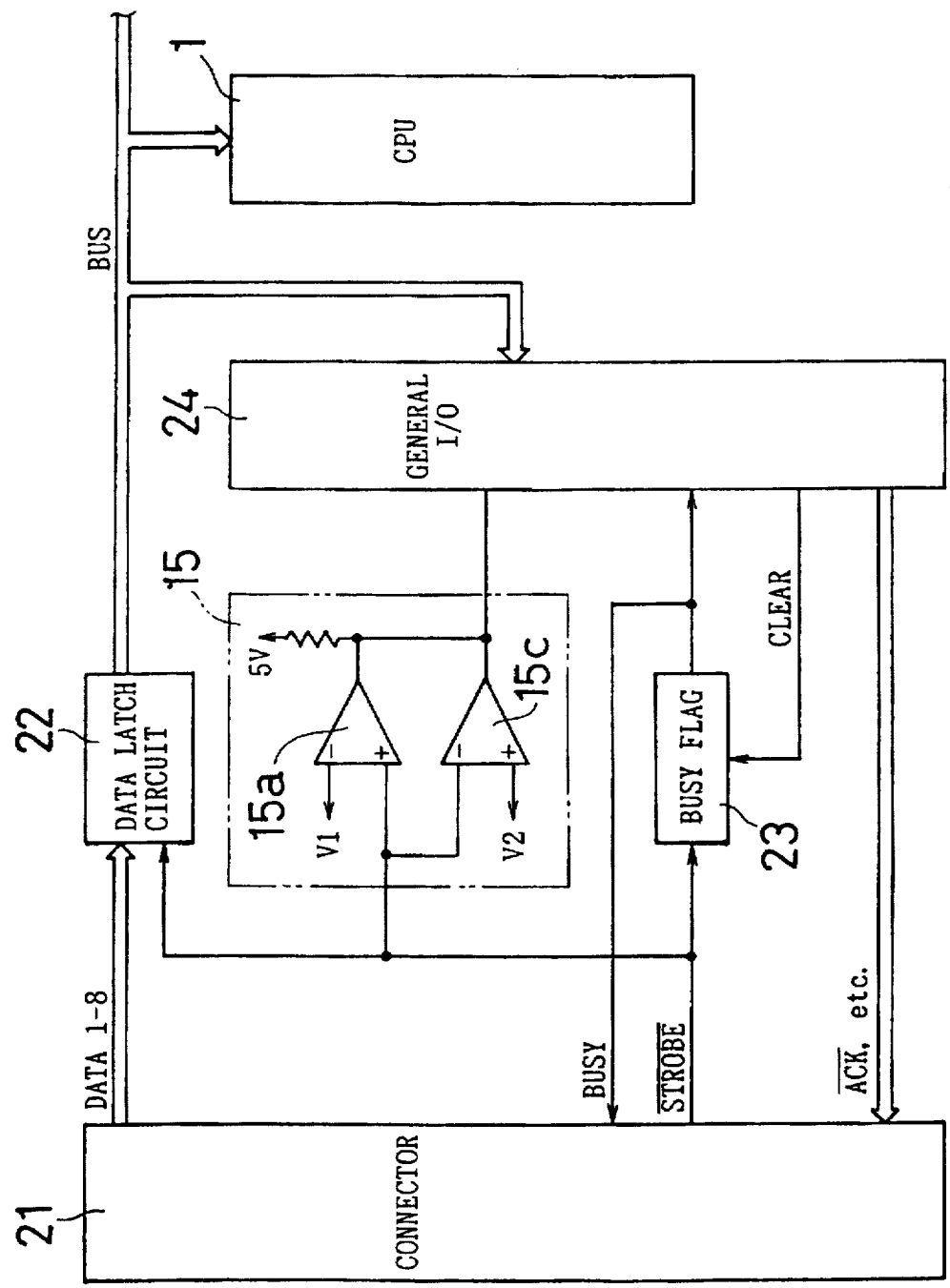
FIG. 8 is a block diagram showing an interface 7 in relation to another embodiment of the invention.

FIG. 8 is a block diagram showing the interface 7 of another embodiment of the invention. The overall structure of the printing apparatus of this embodiment is similar to that of FIG. 1, redundant description will be omitted. Further, the interface 7 of this embodiment uses a window comparator, which is formed by the two comparators 15a and 15c as the voltage monitoring circuit 15. The structure is otherwise similar to that of FIG. 2.

The comparator 15a is disposed to compare the strobe signal with the first reference voltage V1 and the comparator 15c is disposed to compare the strobe signal with the second reference voltage V2, to monitor a change in the voltage level of the strobe signal. Outputs in an open collector type from the comparators are pulled up to a power supply line. The first reference voltage V1 and the second reference voltage V2 are supplied from a reference power supply (not shown), and are respectively set, for example, at 4 volts and 1 volt.

1) When the voltage of the strobe signal is higher than the first reference voltage V1, the level of an output from the comparator 15a becomes low. 2) when the voltage of the strobe signal is equal to or lower than the first reference voltage V1 and is equal to or more than the second reference voltage V2, the levels of outputs from the comparators 15a and 15c become high, and 3) when the voltage of the strobe signal is lower than the second reference voltage V2, the level of an output from the comparator 15c becomes the low level. The window comparator is formed as such, and an output from the window comparator is read by the CPU 1 via the general purpose input/output circuit 24.

Figure 9:
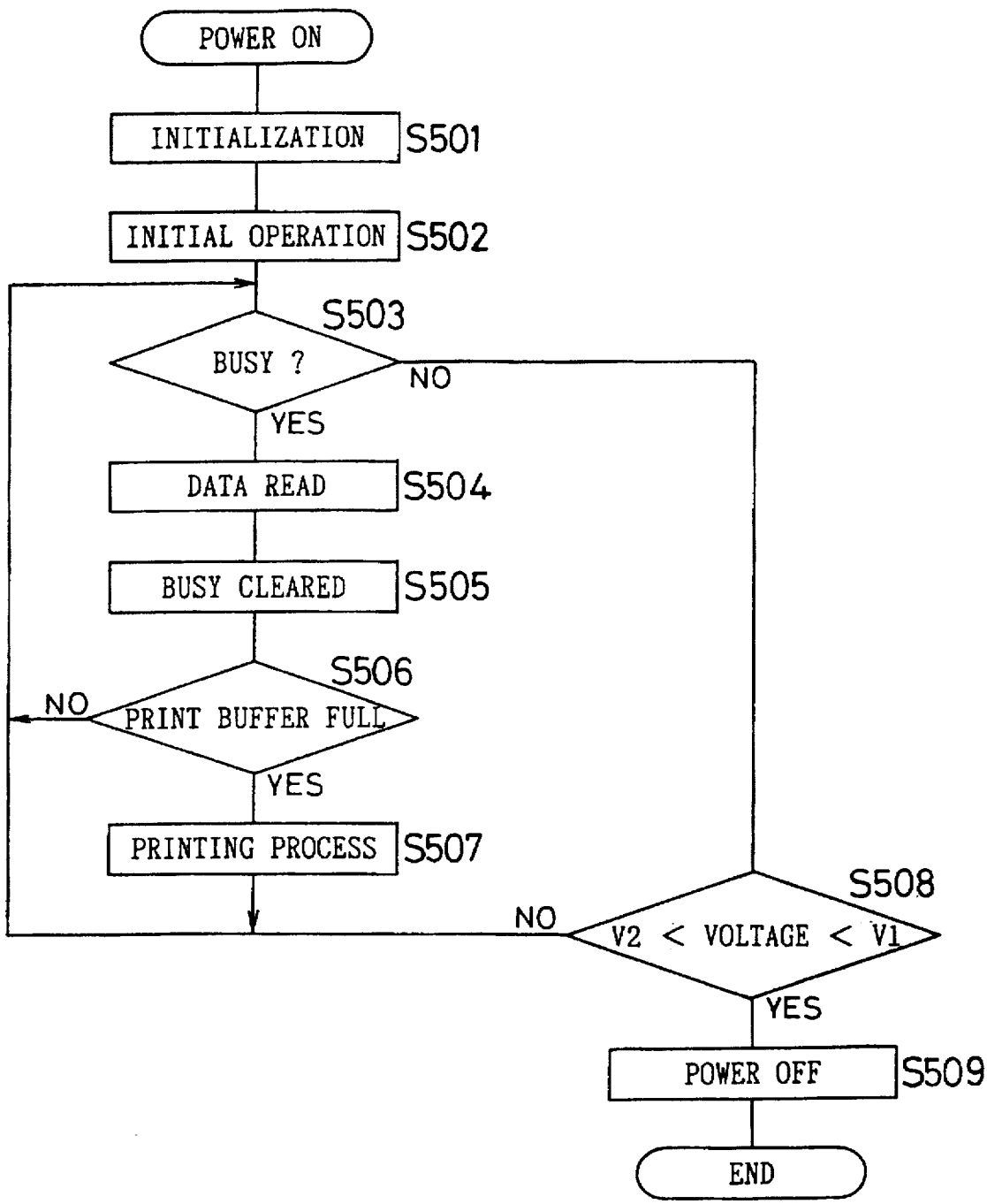
FIG. 9 is a flow chart showing an operation in the structure of FIG. 8.

FIG. 9 is a flow chart showing an operation in the structure of FIG. 8. Since steps S501 through S507 are similar to steps S401 through 407 which are shown in FIG. 7, the description is omitted. In the case where the busy flag 23 is not set up at step S508 after initialization following power-on, the printing apparatus proceeds to step S508 to judge an output from the window comparator as shown in FIG. 8. Since, when the voltage of the strobe signal is equal to or higher than the first reference voltage V1, or equal to or lower than the second reference voltage V2, it can be judged that the external host apparatus 19 is on, the printing apparatus returns to step S508 to remain in the printing standby state.

On the other hand, when the voltage of the strobe signal is lower than the first reference voltage signal, and more than the second reference voltage V2, it can be judged that power supply of the external host apparatus 19 is turned off. Therefore, the printing apparatus proceeds to step S509, where the power save signal 17 is set at the low level to operate the power cutoff circuit 12 and cut off power supply to the power supply line Vcc2, whereby the printing apparatus enters the power saving mode.

Since the window comparator is used as the voltage monitoring circuit 15 as described above, the program of the CPU 1 is made easier, and moreover, data conversion such as A/D conversion is not necessary, so that the length of the routine of monitoring the power supply is shortened.

<Fifth Embodiment>

Figure 10:
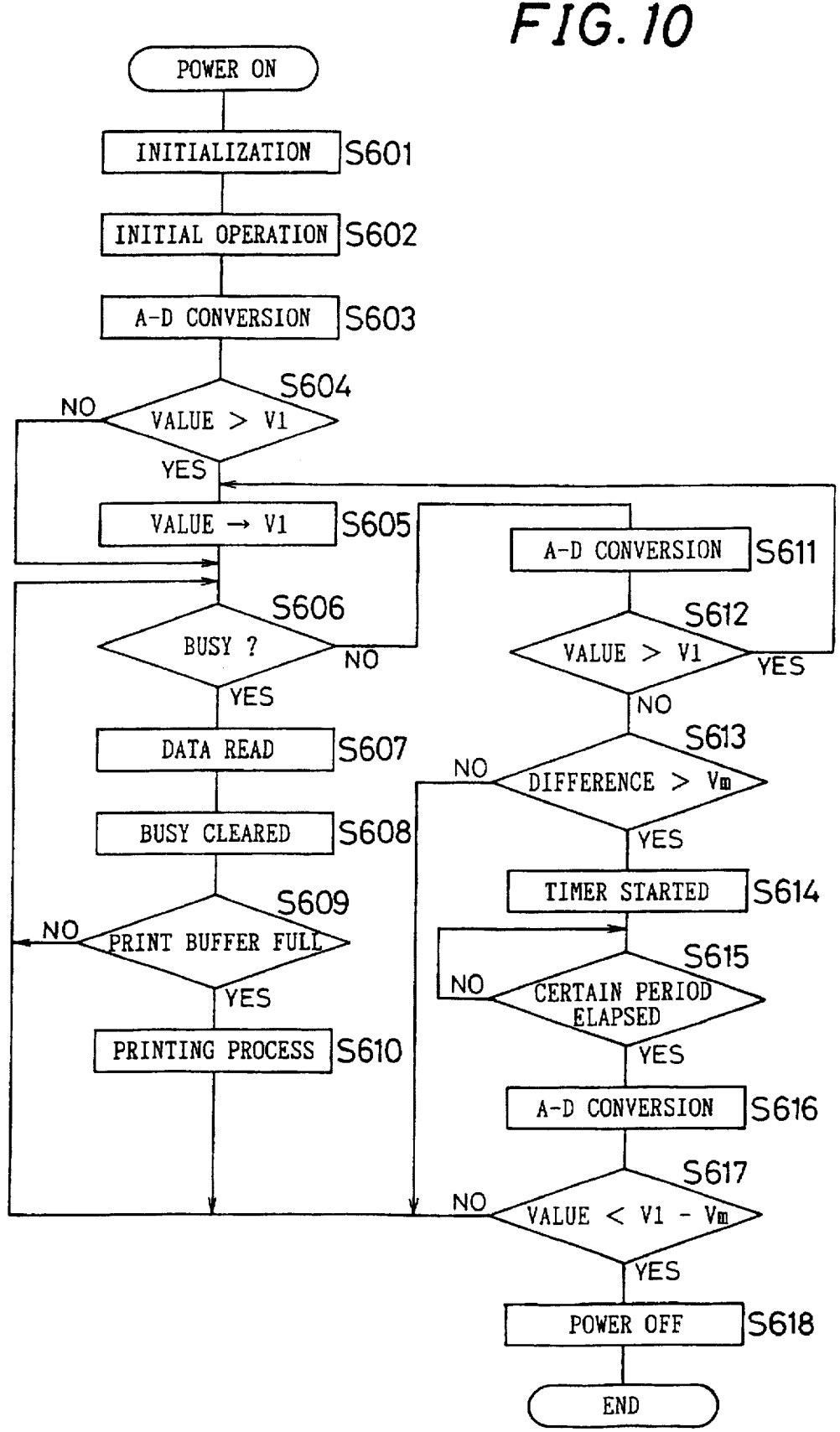
FIG. 10 is a flow chart showing an operation of another embodiment of the invention.
Figure 11:
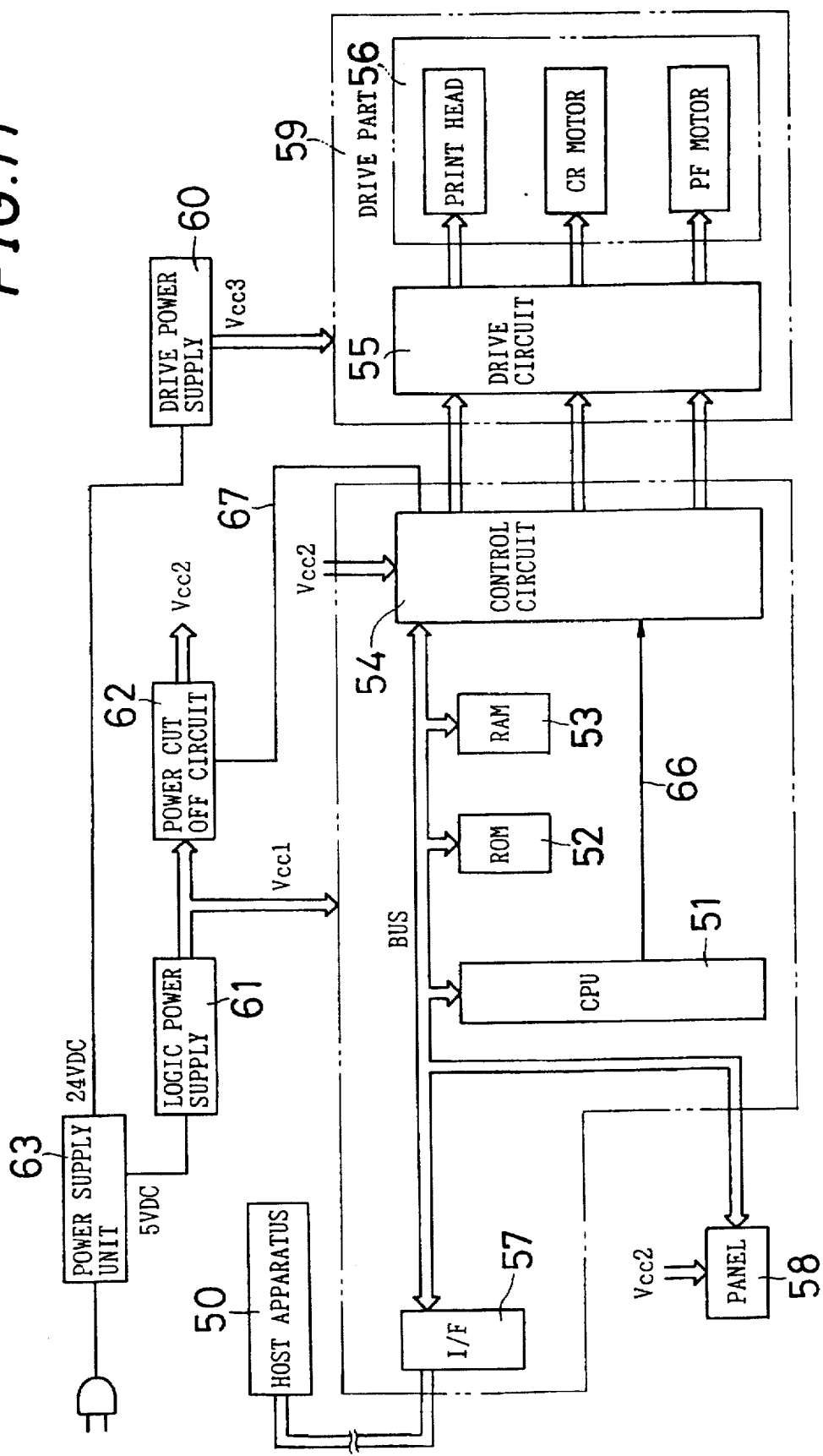
FIG. 11 is a block diagram showing an example of an electric structure of a conventional printing apparatus.
Figure 12:
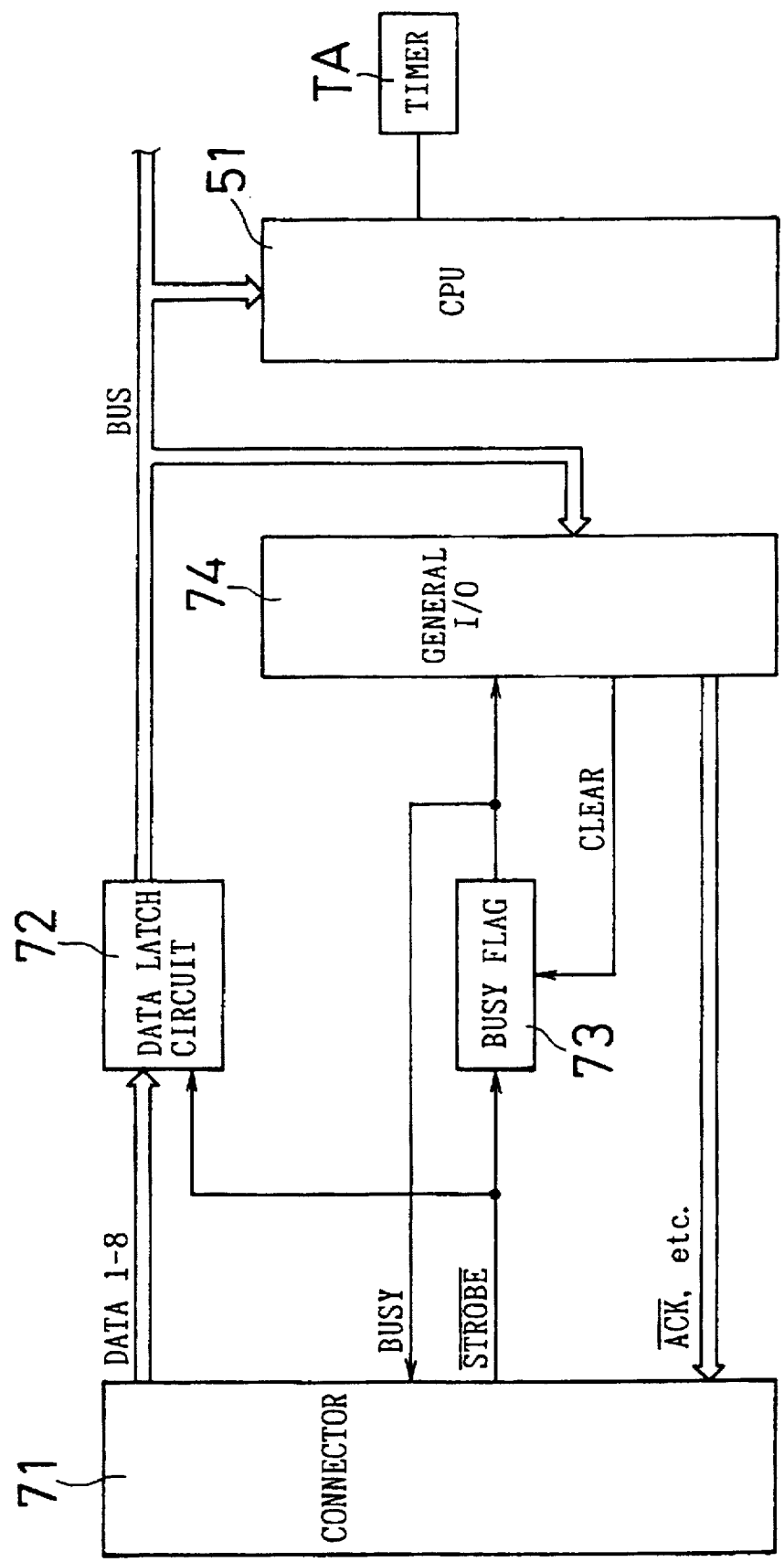
FIG. 12 is a block diagram showing an example of the interface 57.
Figure 13:
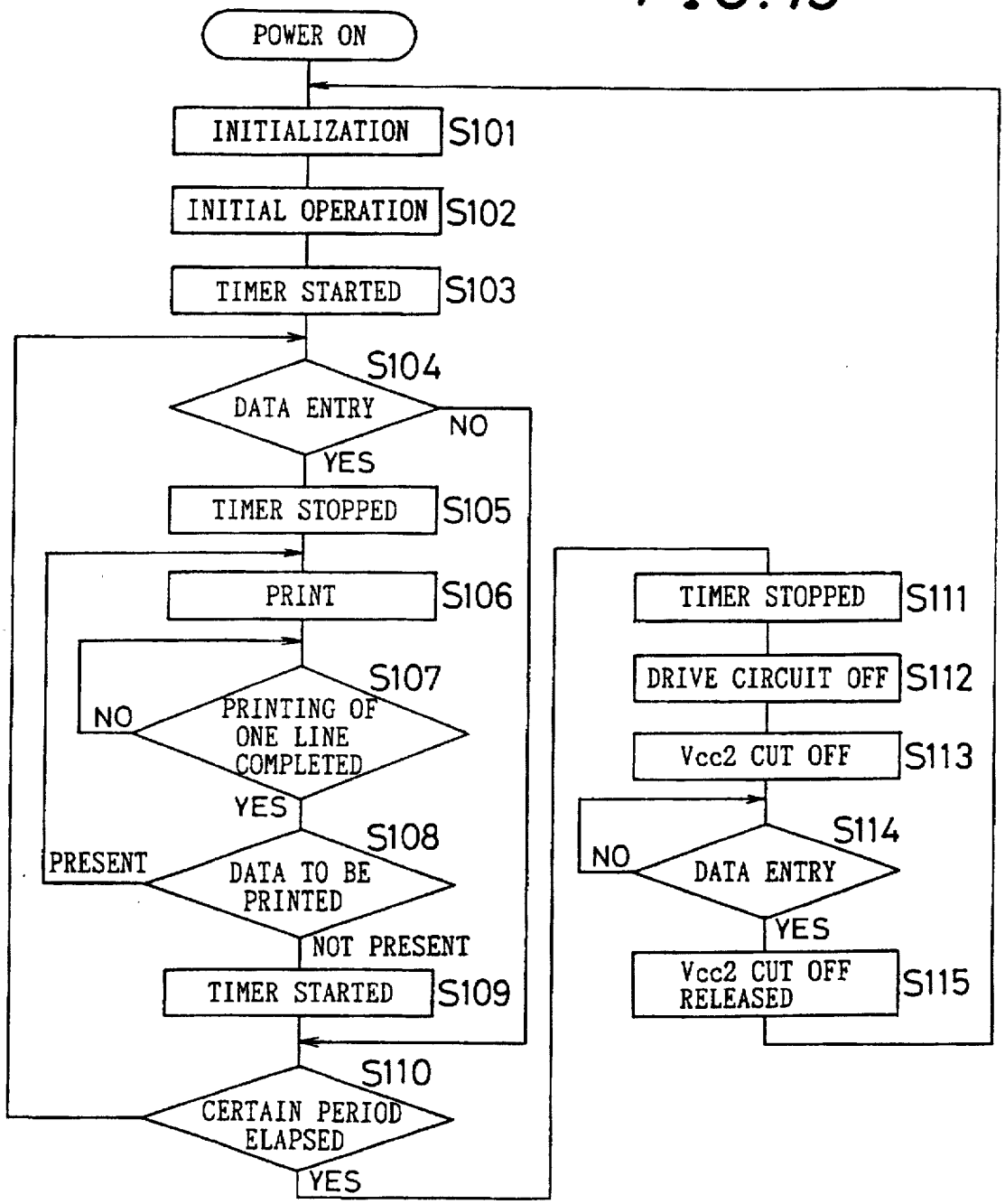
FIG. 13 is a flow chart showing an operation of the conventional printing apparatus.
Figure 14:
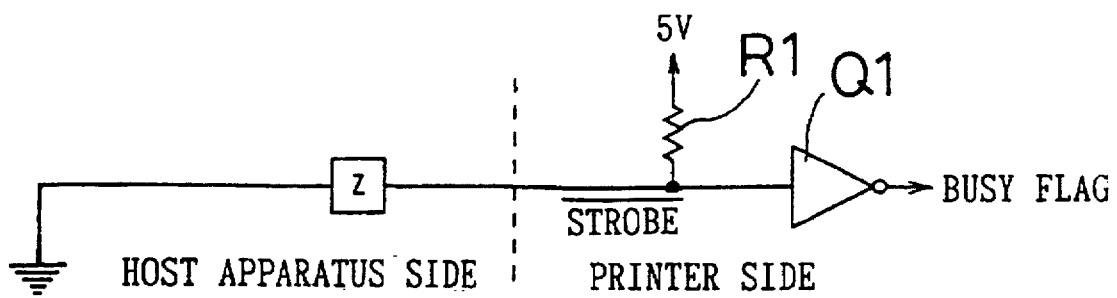

FIG. 10 is a flow chart showing an operation of another embodiment of the invention. Since the overall structure of the printing apparatus of this embodiment is similar to that of FIG. 1, redundant description is omitted. Further, the interface 7 of this embodiment uses the A/D convertor 15b as the voltage monitoring circuit 15, which is similar to the structure as shown in FIG. 6. In this embodiment, a change in the strobe signal with time is monitored and compared with one reference voltage. Additionally, the reference voltage is adjusted automatically.

First, when the power supply of the printing apparatus is turned on, the RAM 3, the interface 7, the operation panel 8 and the control circuit 4 are initialized at step S601. Next, at step S602, the drive circuit 5 and the drive part 6 are operated via the control circuit 4 to initialize a printing position, a printing condition, etc., so that the printing apparatus enters the printing standby state. When the printing apparatus receives a print instruction from the external host apparatus 19 under this state, the printing apparatus can start printing.

Next, at step S603, an operation of the A/D convertor 15b is started and the voltage of the strobe signal is measured. At step S604, the voltage of the strobe signal is compared with the reference voltage V1 stored in the ROM 2 or the RAM 3 in advance. In this embodiment, V1 is set to about 4 volts. In the case where a measured value is higher than V1, the measured value is stored in the RAM 3, as the first reference voltage V1.

At step S606, whether the busy flag 23 is set up is judged to detect whether there is a change in the level of the strobe signal. In the case where the busy flag 23 is set, judging that there was data entry, processing including readout of data, clearing of the busy flag 23, judgment of whether the print start condition is satisfied, and printing is performed at steps S606 through S610, similarly to steps S403 through S407 of FIG. 7.

On the other hand, in the case where the busy flag 23 is not set up at step S606, the apparatus proceeds to step S611, whereby the A/D convertor 15b starts operating. At step S612, the measured value obtained by the A/D convertor 15b is compared with the first reference voltage V1 stored in the RAM 3. In the case where the measured value is higher than the first reference voltage V1, the apparatus returns to step S605 to update the first reference voltage V1.

In the case where the measured value is equal to or lower than the first reference voltage V1, the apparatus proceeds to step S613 to calculate a difference between the measured value and the first reference voltage V1, and compare the difference with an allowable difference value Vm separately stored in the RAM 3. The allowable difference value Vm is determined considering a change in the power supply voltage, and, for example, a value of about 0.5 volt is selected as the allowable difference value Vm in advance. In the case where the difference between the measured value and the first reference voltage V1 is equal to or less than the allowable reference value, this means that the level of the strobe signal is stable. Hence, judging that the external host apparatus 19 is on, the apparatus returns to step S606.

On the other hand, in the case where the difference between the measured value and the first reference voltage V1 is larger than the allowable difference value Vm, this means that the strobe signal is changing with time, e.g., data transfer is performed, and therefore, the apparatus proceeds to step S614. The timer is thereafter started, and the apparatus is in the standby state for a certain length of time at step S615. To judge the condition of data transfer, the standby time is selected to be about 100 microseconds.

Next, the A/D comparator 15a starts operating again at step S616, and a measured value yielded by the A/D comparator 15a is compared with the first reference voltage V1 stored in the RAM 3, at step S617. In the case where the measured value is equal to or more than a value obtained by subtracting the allowable difference value Vm from the first reference voltage V1, judging that the external host apparatus 19 is on, the apparatus returns to step S606.

On the other hand, in the case where the measured value is smaller than the value obtained by subtracting the allowable difference value Vm from the first reference voltage V1, judging that power supply of the external host apparatus 19 is turned off, the apparatus enters the power saving mode at step S618.

In the foregoing has been described a case where the power supply of the external host apparatus 19 is already in on-state before the power supply of the printing apparatus is turned on. Now, a description will be given on a case where the power supply of the printing apparatus is turned on when the power supply of the external host apparatus 19 is in off-state. In this case, the processes at steps S601 through S605 are executed in a manner similar to in on-state, and the busy flag 23 is judged at step S606. Here, since the power supply of the external host apparatus 19 is in off-state, the busy flag 23 is never set. Then the apparatus proceeds to step S611 and the subsequent steps. In the case where the power supply of the external host apparatus 19 is not in on state even after a certain length of time, the apparatus enters the power saving mode at step S618. On the other hand, the apparatus returns to step S606 through a branching point at step S617, in the case where the power supply of the host is turned on prior to step S616. A/D conversion is performed at step S611. Since the measured value becomes larger at step S612, the apparatus returns to step S605, wherein the measured value is stored as the first reference voltage V1. Following this, processing is performed which is similar to that performed when the external host apparatus 19 is on.

In this manner, by automatically adjusting the first reference voltage V1, more reliable judgment is possible.

Although the foregoing has described a method of automatically adjusting the first reference voltage V1 in the embodiments, even when the first reference voltage V1 and the second reference voltage V2 are used as described in the embodiments above, it is possible to automatically adjust the first reference voltage V1 in a similar manner.

While the above embodiments are related to an example where a strobe signal is used as the host side signal to be monitored, any other signal may be used instead as long as the signal stays at the high or low level without fail when the external host apparatus is on but becomes intermediate when power supply to the external host apparatus is turned off.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A printing apparatus comprising:
   interface means for receiving a host side signal outputted from an external host apparatus;
   image formation means for forming an image on a recording medium;
   main control means for transmitting and receiving a signal between the interface means and the image formation means and processing the signal in accordance with a predetermined program; and
   voltage monitoring means for monitoring a voltage of the host side signal to determine whether the voltage is within an upper range defined between a first reference voltage and a source voltage, a middle range defined between the first reference voltage and a second reference voltage and a lower range defined between a ground voltage and the second reference voltage;
   wherein the second reference voltage is set lower than the first reference voltage and higher than a logical threshold value,
   wherein, when the voltage of the host side signal falls within the middle range, a power supply of the external host apparatus is determined to be in an off-state, and
   when the voltage of the host side signal falls within the upper range or the lower range, the power supply of the external host apparatus is determined to be in an on-state.

2. The printing apparatus of claim 1, wherein the first reference voltage is automatically adjustable.

3. The printing apparatus of claim 1, wherein the voltage monitoring means is a comparator or an analog-to-digital converter.

4. A printing apparatus comprising:
   interface means for receiving a host side signal outputted from an external host apparatus;
   image formation means for forming an image on a recording medium;
   main control means for transmitting and receiving a signal between the interface means and the image formation means and processing the signal in accordance with a predetermined program;
   voltage monitoring means for monitoring the voltage of the host side signal; and
   a timer for measuring an elapsed time after inversion of the level of the host side signal; wherein
   a power supply of the external host apparatus is determined to be in a turned-off state when the voltage of the host side signal is equal to or lower than a first reference voltage set higher than a logical threshold value after an elapsed predetermined length of time, measured by the timer, after inversion of the host side signal.

5. The printing apparatus of claim 4, wherein the first reference voltage is automatically adjustable.

6. The printing apparatus of claim 4, wherein the voltage monitoring means is a comparator or an analog-to-digital converter.

7. A printing apparatus comprising:
   interface means for receiving a host side signal including a data signal, outputted from an external host apparatus;
   image formation means for forming an image on a recording medium;
   main control means for transmitting and receiving a signal between the interface means and the image formation means and processing the signal in accordance with a predetermined program;
   voltage monitoring means for monitoring a change in the level of the host side signal and comparing the host side signal with a reference level higher than a threshold value level of other signals; and
   a timer for measuring an elapsed time after inversion of the level of the host side signal; wherein
   a data signal from the external host apparatus is determined to have been received when the host side signal is higher than the reference level after an elapsed predetermined length of time, measured by said timer, after inversion of the level of the host side signal.

8. The printing apparatus of claim 7, wherein the voltage monitoring means is a comparator or an analog-to-digital converter.

9. A printing apparatus comprising:
   interface means for receiving a host side signal including a data signal, outputted from an external host apparatus;
   image formation means for forming an image on a recording medium;
   main control means for transmitting and receiving a signal between the interface means and the image formation means and processing the signal in accordance with a predetermined program;
   power supply control means for stopping or restricting power supply in response to an instruction from the main control means;
   voltage monitoring means for monitoring a change in the level of the host side signal and comparing the host side signal with a reference level higher than a threshold value level of other signals;
   a first timer for measuring an elapsed time after inversion of the level of the host side signal; and
   a second timer for measuring an elapsed time after resumption of a signal input from the external host apparatus; wherein
   when a signal input from the external host apparatus is discontinued for a predetermined length of time, measured by the timer, the power supply control means operates and a power saving mode is entered, and
   when in the power saving mode, an output of the voltage monitoring means is judged after a predetermined length of time measured by the second timer after a signal input from the external host apparatus is resumed, and the power saving mode is released when the host side signal is higher than the reference level.

10. The printing apparatus of claim 9, wherein the voltage monitoring means is a comparator or an analog-to-digital converter.

* * * * *